(12) United States Patent
Xu et al.

(10) Patent No.: US 9,173,109 B2
(45) Date of Patent: Oct. 27, 2015

(54) RADIO LINK QUALITY MONITORING

(71) Applicant: Research In Motion Limited, Waterloo (CA)

(72) Inventors: Hua Xu, Ottawa (CA); Yufei Wu Blankenship, Kildeer, IL (US); Zhijun Cai, Euless, TX (US); Shiwei Gao, Nepean (CA); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 172 days.

(21) Appl. No.: 13/842,612

(22) Filed: Mar. 15, 2013

(65) Prior Publication Data

US 2014/0269368 A1    Sep. 18, 2014

(51) Int. Cl.
*H04W 36/30* (2009.01)
*H04W 24/00* (2009.01)

(52) U.S. Cl.
CPC .................................. *H04W 24/00* (2013.01)

(58) Field of Classification Search
CPC ..... H04W 24/00; H04W 24/10; H04W 24/02; H04W 72/042; H04W 72/085
USPC ......... 370/328, 329, 426, 431, 438, 203–210, 370/336, 330, 333; 455/434, 550.1, 450
See application file for complete search history.

(56) References Cited

U.S. PATENT DOCUMENTS

| | | | |
|---|---|---|---|
| 8,385,222 B2 * | 2/2013 | Lindoff et al. | 370/252 |
| 2013/0039203 A1 * | 2/2013 | Fong et al. | 370/252 |
| 2013/0156015 A1 * | 6/2013 | Abe et al. | 370/336 |
| 2013/0195023 A1 * | 8/2013 | Vaisanen et al. | 370/329 |
| 2013/0252606 A1 * | 9/2013 | Nimbalker et al. | 455/434 |
| 2014/0056279 A1 * | 2/2014 | Chen et al. | 370/330 |

OTHER PUBLICATIONS

3GPP TSG-RAN WG1 Meeting #72; "Discussion on Deployment Scenarios for Dynamic TDD UL-DL Reconfigurations"; R1-130486; St. Julian's, Malta; Jan. 28-Feb. 1, 2013; 4 pages.
3GPP TSG RAN WG4 Meeting #65; "RRM Core Requirements for EPDCCH"; R4-126511; New Orleans, USA; Nov. 12-16, 2012; 2 pages.
PCT International Search Report; Application No. PCT/US2013/043662; Nov. 5, 2013; 3 pages.
PCT Written Opinion of the International Searching Authority; Application No. PCT/US2013/043662; Nov. 5, 2013; 6 pages.
3GPP TS 36.133 V10.8.1; 3rd Generation Partnership Project; Technical Specification Group Radio Access Network; Evolved Universal Terrestrial Radio Access (E-UTRA); Requirements for Support of Radio Resource Management; Release 10; Sep. 2012; 667 pages.

(Continued)

*Primary Examiner* — Hanh N Nguyen
(74) *Attorney, Agent, or Firm* — Conley Rose, P.C.; J. Robert Brown, Jr.

(57) ABSTRACT

Disclosed herein is a method of radio link monitoring (RLM) in a UE comprising the steps of: selecting a control channel type to perform RLM on, wherein the control channel type includes one or more of: a physical downlink control channel (PDCCH); or an enhanced physical downlink control channel (EPDCCH); receiving a transmission on a carrier, the transmission comprising one or more reference signals; and determining the quality of the radio link using the selected control channel type and the one or more reference signals.

30 Claims, 9 Drawing Sheets

(56) References Cited

OTHER PUBLICATIONS

3GPP TS 36.211 V11.2.0; 3rd Generation Partnership Project; Technical Specification Group Radio Access Network; Evolved Universal Terrestrial Radio Access (E-UTRA); Physical Channels and Modulation; Release 11; Feb. 2013; 109 pages.

3GPP TS 36.212 V11.2.0; 3rd Generation Partnership Project; Technical Specification Group Radio Access Network; Evolved Universal Terrestrial Radio Access (E-UTRA); Multiplexing and Channel Coding; Release 11; Feb. 2013; 82 pages.

3GPP TS 36.213 V11.1.0; 3rd Generation Partnership Project; Technical Specification Group Radio Access Network; Evolved Universal Terrestrial Radio Access (E-UTRA); Physical Layer Procedures; Release 11; Dec. 2012; 160 pages.

3GPP TS 36.331 V11.2.0; 3rd Generation Partnership Project; Technical Specification Group Radio Access Network; Evolved Universal Terrestrial Radio Access (E-UTRA); Radio Resource Control (RRC); Protocol Specification; Release 11; Dec. 2012; 340 pages.

* cited by examiner

Distributed EPDCCH region with two PRB

RADIO LINK QUALITY MONITORING

FIELD OF THE DISCLOSURE

The present disclosure relates to radio link quality monitoring.

BACKGROUND

As used herein, the term "user equipment" (alternatively "UE") might in some cases refer to mobile devices such as mobile telephones, personal digital assistants, handheld or laptop computers, and similar devices that have telecommunications capabilities. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user equipment," "UE," "user agent," "UA," "user device," and "mobile device" might be used synonymously herein.

As telecommunications technology has evolved, more advanced network access equipment has been introduced that can provide services that were not possible previously. This network access equipment might include systems and devices that are improvements of the equivalent equipment in a traditional wireless telecommunications system. Such advanced or next generation equipment may be included in evolving wireless communications standards, such as Long-Term Evolution (LTE) and LTE-Advanced (LTE-A). For example, an LTE or LTE-A system might be an Evolved Universal Terrestrial Radio Access Network (E-UTRAN) and include an E-UTRAN node B (or eNB), a wireless access point, or a similar component rather than a traditional base station. As used herein, the term "access node" refers to any component of the wireless network, such as a traditional base station, a wireless access point, or an LTE or LTE-A node B or eNB, that creates a geographical area of reception and transmission coverage allowing a UE or a relay node to access other components in a telecommunications system. In this document, the terms "access node" and "network element" may be used interchangeably, but it is understood that an access node may comprise a plurality of hardware and software.

In 3GPP LTE, a cell may refer to a combination of downlink and/or uplink resources. In general, multiple cells may originate from the same access node (e.g., eNB in LTE) and occupy overlapping geographical areas. When there is no danger of confusion, a cell may refer to the distinctive geographical area of reception and transmission coverage provided by an access node. Some cells may have significantly larger coverage area than others and may be referred to herein as macro-cells. Some cells may have significantly smaller coverage area than the macro-cells and may be referred to herein as small cells. Small cells may also include micro-cells, pico-cells, and femto-cells. In some embodiments, small cells may operate within the area covered by a macro-cell.

A radio link may be established between an access node and a UE. The radio link may comprise an uplink signal with communication from the UE to the access node, and a downlink signal with communication from the access node to the UE. The UE may monitor the downlink signal in order to detect a downlink radio link quality in a cell.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
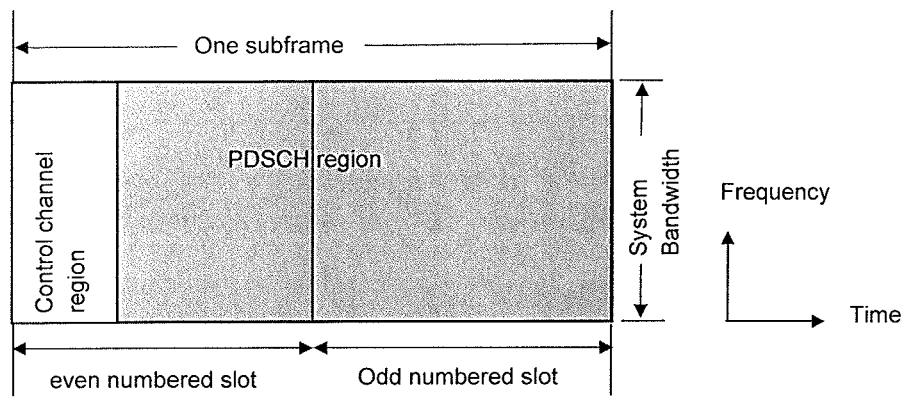
FIG. 1 is a diagram of an LTE subframe.

It should be understood at the outset that Although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. Embodiments are described herein in the context of an LTE wireless network or system, but can be adapted for other wireless networks or systems.

The following acronyms may be used herein:

| Acronym | Full text |
| --- | --- |
| 3GPP | Third Generation Partnership Project |
| ARQ | Automatic Repeat reQuest |
| BD | Blind Decodings |
| BLER | Block Error Rate |
| CCE | Control Channel Element |
| CL | Closed-Loop |
| CoMP | Coordinated Multi-Point |
| CQI | Channel Quality Indicator |
| CRC | Cyclic Redundancy Code |
| CRS | Cell-specific Reference Signal |
| CSI | Channel State Information |
| CSI-RS | Channel State Information Reference Signal |
| CSS | Common search space |
| DCI | Downlink Control Information |
| DL | Down Link |
| DM-RS | Demodulation Reference signal |
| DRX | Discontinuous reception |
| eNB | Evolved Node B |
| E-PDCCH | Enhanced Physical Downlink Control Channel |
| E-UTRAN | Evolved UTRAN |
| FDD | Frequency Division Duplex |
| HARQ | Hybrid ARQ |

-continued

| Acronym | Full text |
|---|---|
| LPN | Low Power Node |
| LTE | Long Term Evolution |
| LTE-A | LTE-Advanced |
| MBSFN | Multimedia Broadcast multicast service Single Frequency Network |
| MIMO | Multiple Input and Multiple Output |
| ms | Millisecond |
| MU-MIMO | Multi-User MIMO |
| NCT | New Carrier Type |
| OFDM | Orthogonal Frequency Division Multiplexing |
| OL | Open-Loop |
| PBCH | Physical Broadcast Channel |
| PCell | Primary Cell |
| PCFICH | Physical Control Format Indicator Channel |
| PDCCH | Physical Downlink Control Channel |
| PDSCH | Physical Downlink Shared Channel |
| PMI | Precoding Matrix Indicator |
| PRB | Physical Resource Block |
| PSS | Primary Synchronization Signal |
| RB | Resource Block |
| RE | Resource Element |
| RI | Rank indicator |
| RLF | Radio Link Failure |
| RLM | Radio Link Monitoring |
| R-PDCCH | Relay Physical Downlink Control Channel |
| RRC | Radio Resource Control |
| RRH | Remote Radio Head |
| RS | Reference Signal |
| R-UIM | removable user identity module |
| Rx | Receive |
| SF | Sub-Frame |
| SFN | Single Frequency Network |
| SFBC | Space Frequency Block Code |
| SIB | System Information Block |
| SIM | Subscriber Identity Module |
| SSS | Secondary Synchronization Signal |
| STBC | Space Time Block Code |
| SU-MIMO | Single User MIMO |
| TM | Transmission Mode |
| TP | Transmission Point |
| Tx | Transmit |
| TxD | Transmit Diversity |
| UA | User Agent |
| UE | User Equipment |
| UICC | Universal Integrated Circuit Card |
| UL | Uplink |
| USIM | Universal Subscriber Identity Module |
| UTRAN | UMTS Terrestrial Radio Access Network |
| VRB | Virtual Resource Block |

In 3GPP LTE, Physical downlink control channel (PDDCH) is used to carry control information. To increase the control channel capacity, in 3GPP LTE Rel-11, enhanced PDDCH (EPDCCH) is introduced to carry control information. Radio link monitoring (RLM) may be performed based on control information transmitted on EPDCCH and/or PDDCH. In some embodiments, when PDCCH is configured on a new carrier type (NCT), RLM may be based on cell specific reference signals (CRS), where the number of CRS ports used on the NCT may be less than the number of CRS ports used on carriers predating NCT. Further, a reduced resource density used for CRS in either time or frequency may be used. In another embodiment, when EPDCCH is configured and control information for RLM is assumed to transmit on EPDCCH, channel state information reference signals (CSI-RS) may be used for RLM. In another embodiment, when EPDCCH is configured and control information for RLM is assumed to transmit on EPDCCH, demodulation reference signals (DMRS) may be used for RLM. When one or both PDCCH and EPDCCH are configured for the same UE, RLM may be based on any one or more of CRS, CSI-RS, or DMRS. Determining whether to use CRS, CSI-RS, or DMRS may be implicit or explicitly signaled. With introduction of EPDCCH and NCT, new metrics based on the detection (or decoding) performance of control information may be used for RLM, for example new downlink control information (DCI) formats may be used for RLM on NCT. Rules for RLM in cells where multiple carriers are deployed may also be necessary. In some embodiments, the rules may be based on independent carriers or joint performance of multiple carriers. Lastly, rules for RLM among cells using coordinated multipoint (CoMP) transmission may also need to be defined.

FIG. 1 is a diagram of a LTE subframe 100. The subframe 110 may comprise an even numbered slot 120 and an odd numbered slot 130 and a quantity of system bandwidth 140. The first few orthogonal frequency division multiplex (OFDM) symbols of the even numbered slot 120 may be used as a control channel region 150. The control channel region 150 may be used for PDCCH transmission. The remaining OFDM symbols in the subframe may be used as a physical downlink shared channel (PDSCH) region 160 for PDSCH transmission.

In LTE Rel-11 and earlier releases, for the purpose of Radio Link Failure (RLF) detection, the UE may monitor the downlink radio link quality of a primary cell (PCell) based on measuring the propagation channel using cell-specific reference signals (CRS) and may use the measurements to estimate the detection (or decoding) performance of a hypothetical PDCCH transmission in order to detect the downlink radio link quality of a PCell. For RLF detection, the UE may estimate the downlink radio link quality and compare it to a pair of predetermined thresholds $Q_{out}$ and $Q_{in}$. The threshold $Q_{out}$ may be defined as the level at which the downlink radio link is not reliable and may correspond, e.g., to 10% block error rate (BLER) of a hypothetical PDCCH transmission (in this case, DCI format 1A). The BLER may take into account the physical control format indicator channel (PCFICH) errors with transmission parameters specified in Table 1 below. The threshold $Q_{in}$ may be defined as the level at which the downlink radio link quality may be significantly more reliable than at $Q_{out}$ and may correspond, e.g., to 2% block error rate of a hypothetical PDCCH transmission (in this case, DCI format 1C). The BLER may take into account the PCFICH errors with transmission parameters specified in Table 2 below. Tables 1 and 2 are taken from $3^{rd}$ generation partnership project (3GPP) technical specification (TS) 36.133.

TABLE 1

| Attribute | Value |
|---|---|
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average RS RE energy | 4 dB; when single antenna port is used for cell-specific reference signal transmission by the PCell.<br>1 dB: when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB: when two or four antenna ports are used for cell-specific reference signal transmission by the PCell. |

Note 1:
DCI format 1A is defined in section 5.3.3.1.3 in 3GPP TS 36.212 [21].

Note 2:
A hypothetical PCFICH transmission corresponding to the number of control symbols shall be assumed.

TABLE 2

| Attribute | Value |
| --- | --- |
| DCI format | 1C |
| Number of control OFDM symbols | 2; Bandwidth ≥ 10 MHz<br>3; 3 MHz ≤ Bandwidth ≤ 5 MHz<br>4; Bandwidth = 1.4 MHz |
| Aggregation level (CCE) | 4 |
| Ratio of PDCCH RE energy to average RS RE energy | 0 dB; when single antenna port is used for cell-specific reference signal transmission by the PCell.<br>−3 dB; when two or four antenna ports are used for cell-specific reference signal transmission by the PCell. |
| Ratio of PCFICH RE energy to average RS RE energy | 4 dB; when single antenna port is used for cell-specific reference signal transmission by the PCell.<br>1 dB; when two or four antenna ports are used for cell-specific reference signal transmission by the PCell. |

Note 1:
DCI format 1C is defined in section 5.3.3.1.4 in 3GPP TS 36.212 [21].

Note 2:
A hypothetical PCFICH transmission corresponding to the number of control symbols shall be assumed.

The downlink radio link quality of a PCell may be estimated over a 200 ms period for radio link failure. In one example, if, after the 200 ms, the measured/calculated downlink radio quality becomes worse than the threshold $Q_{out}$, Layer 1 of the UE may send an out-of-sync indication for the cell to the higher layers.

The downlink radio link quality of a PCell may be estimated over a 100 ms period for reliable radio link quality. If, after the 100 ms period, the downlink radio quality becomes better than the threshold $Q_{in}$, Layer 1 of the UE may send an in-sync indication to the higher layers.

Figure 2:
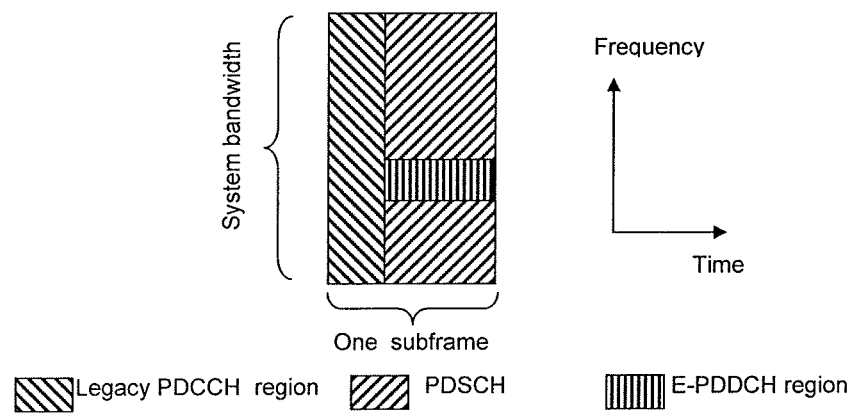
FIG. 2 is a diagram of a subframe with enhanced physical downlink control channel (EPDCCH).

In 3GPP Rel-11 enhanced PDCCH (EPDCCH) is introduced. EPDCCH may increase the capacity of legacy PDCCH as well as utilize more advanced techniques for control channel transmission. As shown in FIG. 2, EPDCCH may be transmitted in the PDSCH region that is used for PDSCH transmission. In some embodiments, a number of Physical Resource Block (PRB) pairs in the PDSCH region may be allocated as an EPDCCH region and used for EPDCCH transmission, where a PRB pair comprises 12 subcarriers in frequency domain and 2 slots (14 OFDM symbols for normal cyclic prefix) in time domain. The PRB pairs may be either contiguous or not contiguous in frequency. There may be two types of EPDCCH transmission, localized EPDCCH transmission and distributed EPDCCH transmission.

Figure 3:
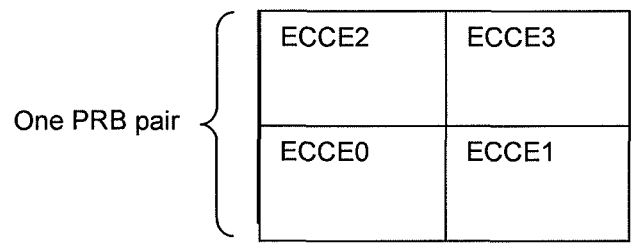
FIG. 3 is a diagram of ECCE within a physical resource block (PRB) pair.

For localized EPDCCH transmission, EPDCCH may be transmitted over contiguous resource blocks using techniques such as beamforming (BF). FIG. 3 shows an example of resource allocation for localized EPDCCH transmission, where a PRB pair may be further divided into 4 logical small units called enhanced control channel elements (ECCEs). An EPDCCH may be transmitted over 1, 2, or 4 ECCEs in a PRB pair. When DMRS is used for EPDCCH demodulation, each EPDCCH may be transmitted using one of the DMRS ports {107, 108, 109, 110} in a PRB pair.

Figure 4:
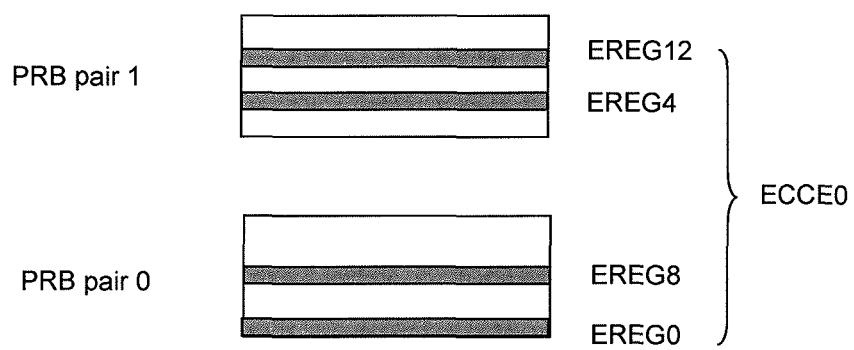
FIG. 4 is a diagram of a distributed EPDDCH transmission.

For distributed EPDCCH transmission, EPDCCH may be transmitted over a number of distributed resources across a wider bandwidth than the bandwidth used by localized EPDCCH. FIG. 4 shows an example of resource allocation for distributed EPDCCH transmission, in this case, a logical ECCE may be further divided into 4 smaller resource units called enhanced resource element groups (EREGs). The EREGs may be transmitted in two PRB pairs which may be distributed across the system bandwidth. Distributed EPDCCH transmission may be used to utilize the diversity gain including frequency diversity and spatial diversity, which may be beneficial when propagation channel feedback is not reliable and therefore BF transmission for EPDCCH may not be feasible. To obtain spatial diversity for distributed EPDCCH transmission, random beamforming (RBF) techniques may be used, where different randomly generated precoding vectors may be applied alternatively over EPDCCH transmitted on different resource elements (RE). In this case, DMRS ports {107, 109} may be used alternatively for EPDCCH transmission on different REs.

Figure 5:
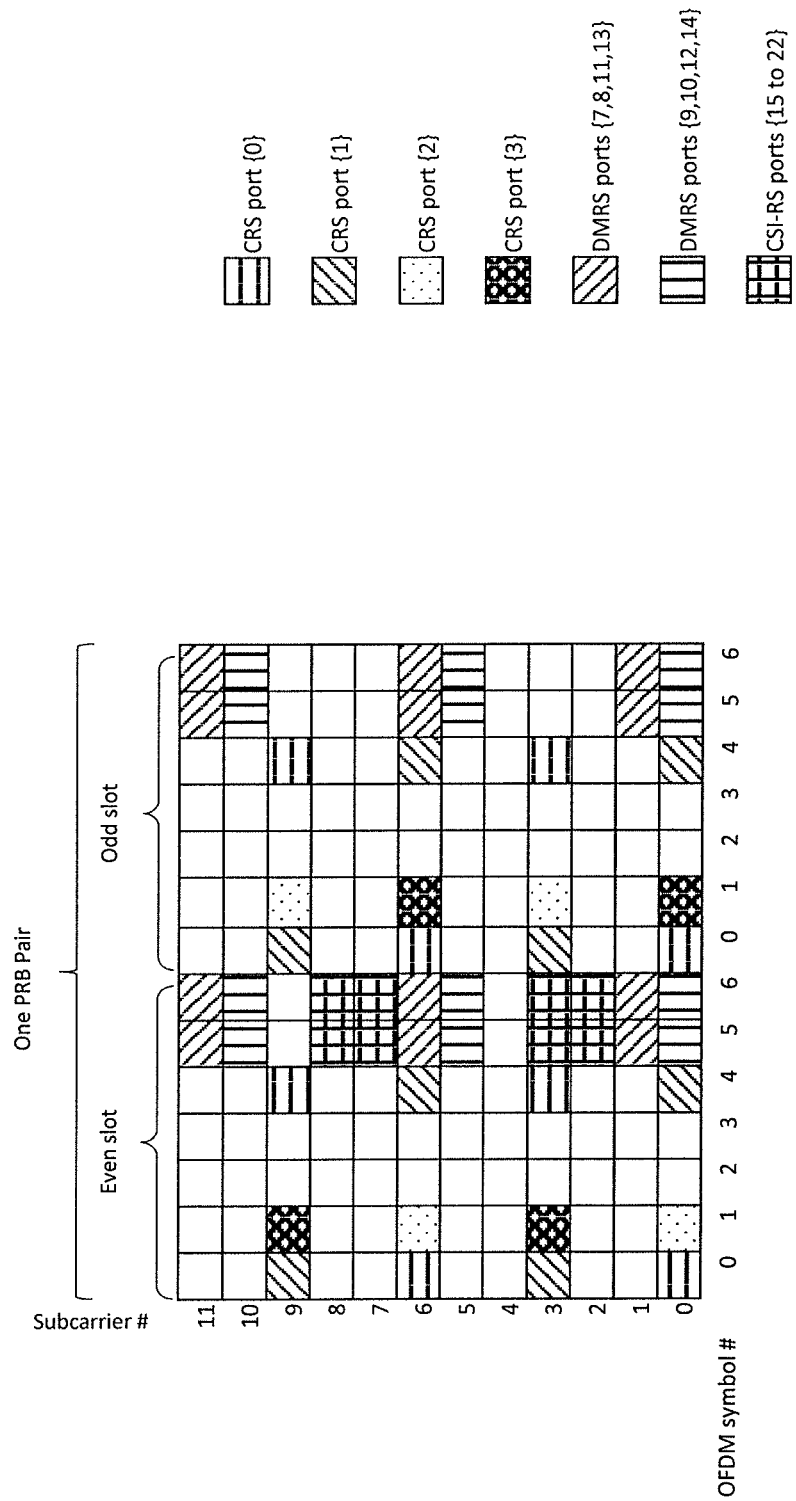
FIG. 5 is a diagram of reference signal locations in an LTE PRB pair.

From 3GPP LTE Rel-8 to Rel-11, various reference signals (RS) were introduced in downlink for UEs to measure a channel for feedback and demodulation. FIG. 5 shows an example of various RS. CRS was introduced in LTE Rel-8, while CSI-RS and DMRS (aka UE-specific RS) were introduced in LTE Rel-10. To be more specific, CRS may be used for both channel measurement/feedback and PDSCH and PDCCH demodulation, while CSI-RS may only be used for channel measurement/feedback and DMRS may only be used for PDSCH demodulation. For EPDCCH, DMRS may also be used for EPDCCH demodulation.

Figure 6:
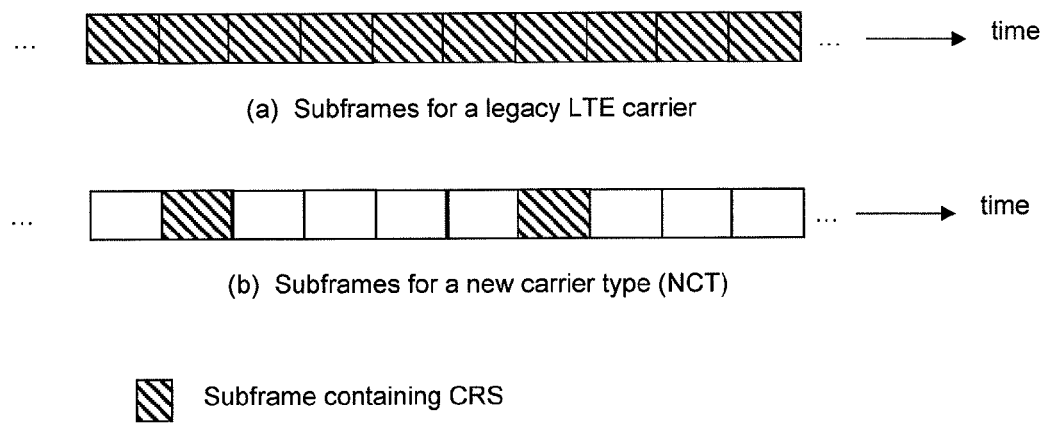
FIG. 6 is a diagram of subframe locations containing cell-specific reference signal (CRS).

In Rel-11, new carrier type (NCT) is discussed. NCT may be a non-backward compatible carrier. NCT may reduce overhead and improve spectrum efficiency. Comparing with legacy carrier, NCT may not carry some signals and/or channels such as CRS, Primary Synchronization Signal (PSS)/Secondary Synchronization Signal (SSS), or carrying fewer of such signals and/or channels in time and/or frequency domain. Even if these signals and channels are transmitted on NCT, the overhead required for them may be reduced. For example, for CRS transmission, the number of CRS ports, and/or density of CRS transmission may be reduced. FIG. 6 shows an example of NCT and legacy carrier, from which it can be observed that legacy carrier may transmit CRS in all subframes, while NCT may only transmit CRS in selected subframes.

With the introduction of EPDCCH, the hypothetical DCI formats used for radio link monitoring may be transmitted on EDPCCH instead of legacy PDCCH. As the performance of legacy PDCCH and EPDCCH may be different, RLM based on hypothetical PDCCH may not provide accurate radio link quality detection when EPDCCH is used. Further, the PDCCH and EPDCCH may both be supported in a carrier in the same or difference subframes. The hypothetical DCI formats used for RLM may be transmitted in legacy PDCCH or EPDCCH in the same or different subframes. What hypothetical DCI formats should be used for RLM and where to assume the transmission of hypothetical DCI formats for RLM may be re-defined. EPDCCH may use DMRS for demodulation instead of CRS which may be used for legacy PDCCH decoding, the signal used for RLM may also need to be re-examined if hypothetical DCI formats used for RLM are assumed to be transmitted on EPDCCH. If NCT is used in a cell that is a secondary cell affiliated with a legacy PCell, then RLM may be conducted on PCell and legacy radio link quality monitoring procedure may be used. However, if a NCT is deployed as a secondary cell (SCell) or a PCell, the legacy radio link quality monitoring procedure may not work in some scenarios (e.g. when there is no CRS transmission on NCT and EPDCCH is used for carrying DCI 1A and/or DCI 1C).

As described above, if NCT is used, CRS may not be transmitted or may be transmitted with reduced density in time/frequency, or reduced number of CRS ports on the NCT. This may impact $Q_{out}/Q_{in}$ measurement. To support radio link monitoring for NCT, the signals used for measurement may need to be reconsidered. Further, for RLM on a legacy carrier, error rate for hypothetical PDCCH (DCI formats 1A and 1C) is used as the metric to determine if the radio link is reliable or not. As described above, EPDCCH may be introduced to improve the capacity and robustness of a control channel, as EPDCCH may be transmitted instead of PDCCH on NCT, the metric to determine radio link quality on such carriers may also need to be reconsidered. Thus for 3GPP Rel-12 and later UEs, a new set of $Q_{out}/Q_{in}$ thresholds and the corresponding measurements may need to be defined, in addition to the existing set of thresholds and measurements for 3GPP Rel-11 and earlier. The UE may choose to use the existing set or the new set after detecting the carrier/cell type. If the carrier/cell uses legacy control region definition and PDCCH transmission, the existing set may be used. If the carrier/cell does not use legacy control region definition and PDCCH transmission, the new set of thresholds may be used. In some embodiments, the existing sets and the new sets may be combined to be used.

For NCT, to improve the peak data rate, overhead of CRS may be reduced by one or more of (a) the reduction of the number of CRS ports transmitted even though there may be more than one physical antennas and (b) the reduction of the CRS density in either time or frequency domain or both. In some embodiments, CRS overhead reduction may be achieved by only transmitting one CRS port, e.g., CRS port {0}. Transmitting only one CRS port may reduce the CRS overhead to about 5%. In this case, the existing CRS based Radio Link Monitoring procedure for single antenna may still be used for $Q_{out}/Q_{in}$ measurement for RLF. However, if EPDCCH is configured for DCI 1A and DCI 1C transmission where DMRS, not CRS, are used for demodulation, the UE may need to take that difference into account in the radio link quality monitoring.

Figure 7:
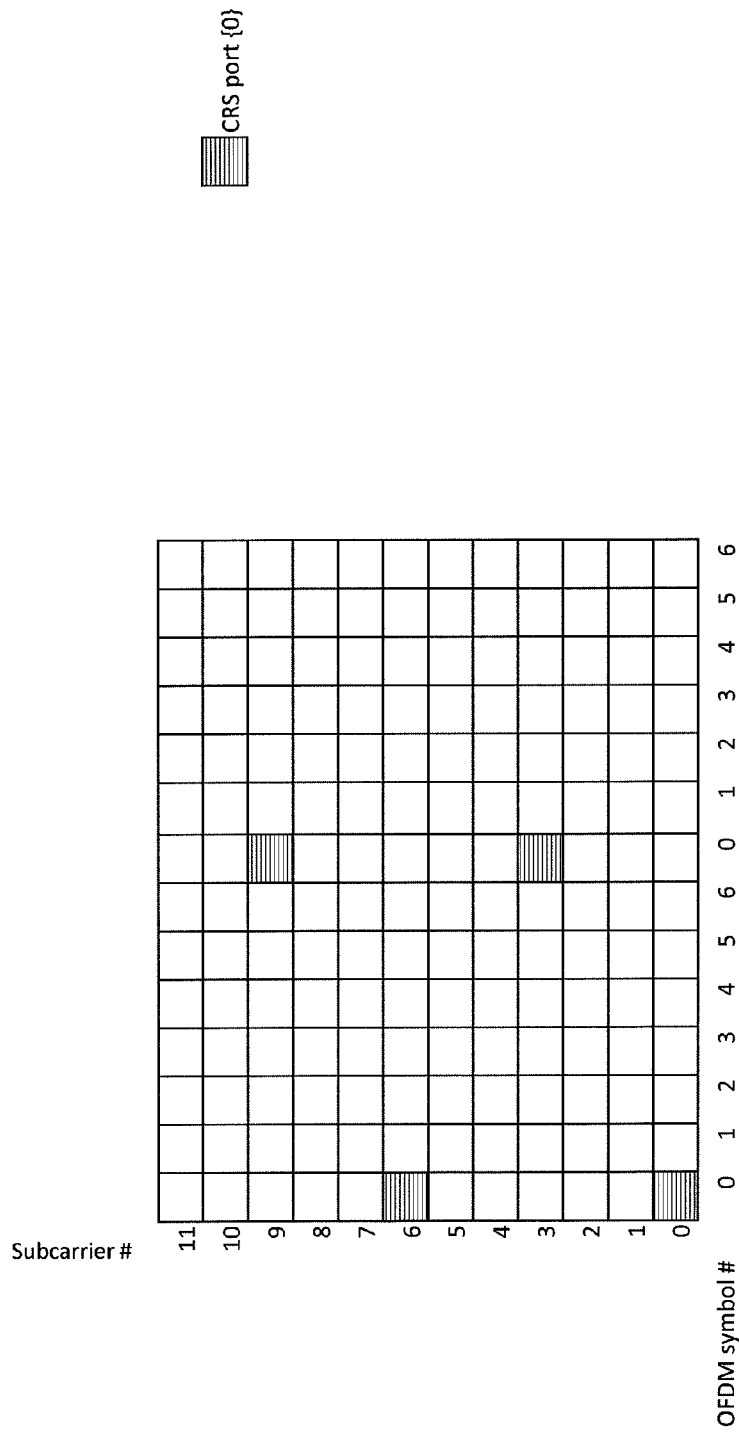
FIG. 7 is a diagram of CRS port {0} with reduced CRS density.

If further reduction of CRS overhead is desired, the CRS density (average number of REs used for CRS per physical resource block pair) may be reduced in either time or frequency or both time and frequency if NCT is used for small cell. This is because the delay spread and Doppler spread may be smaller for small cells with low mobility UEs, which may lead to a flatter propagation channel. Thus even though the CRS density may be reduced, the performance of channel estimation may still be acceptable. FIG. 7 shows an example of using CRS port {0} but with reduced CRS density in time direction. Such reduction may cut the CRS overhead further by half from 5% to 2.5% in a PRB pair.

Figure 8:
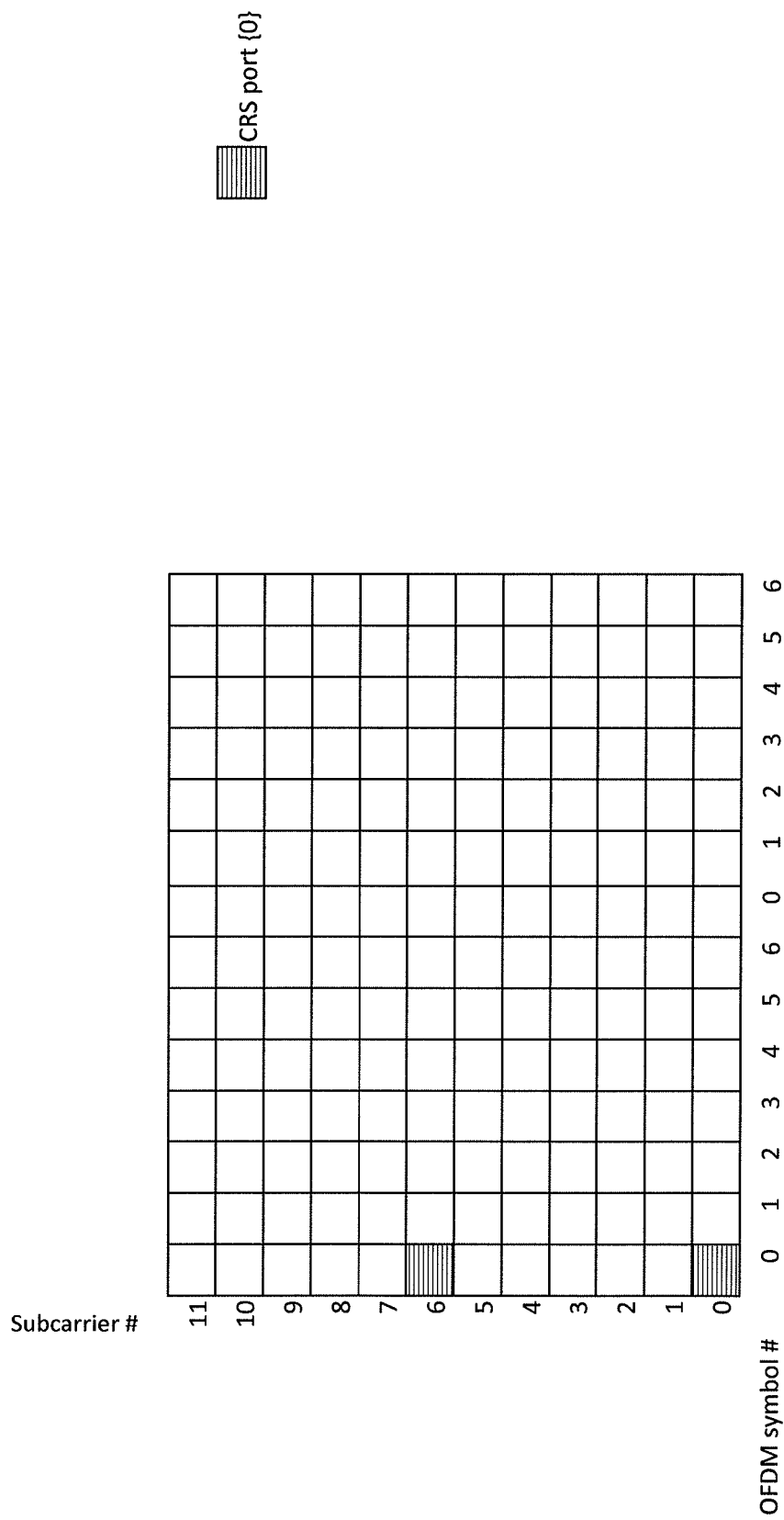
FIG. 8 is a diagram of CRS from CRS port {0} only transmitted on the first OFDM symbol in a subframe.

When radio link quality is measured using the metric of hypothetical PDCCH, which may be transmitted in the first few OFDM symbols of a subframe, the CRS may be transmitted in only the first OFDM symbol of a subframe as shown in FIG. 8. In this case, the CRS may not be used for PDSCH demodulation, but may still be used for PDCCH demodulation and for DL radio link quality measuring. If such a CRS resource reduction scheme is adopted, more subframes may be needed to achieve the same link quality measurement. For example, for the current $Q_{out}$ measurements, a UE may assess the radio link quality every radio frame (i.e. 10 ms), evaluated over the previous 200 ms duration (for $Q_{in}$ it may be 100 ms). If not enough measurement samples may be used during the duration, the measurement may not be accurate. Thus the duration may be adjusted as necessary.

If CRS density is further reduced by transmitting only one RE per PRB pair, instead of two REs per PRB, the one RE used for CRS may hop from subframe to subframe to improve frequency-domain estimation. For example, on odd-indexed subframes, the RE used for CRS may be on RE #i; on even-indexed subframes, the RE used for CRS may be on RE # mod((i+6),12). Such hopping may allow the CRS to transmit across most or all of the system bandwidth and may improve the RLM measurement.

In addition, monitoring CRS for link quality may continue to exist if PDCCH serves as a fall-back for EPDCCH. When EPDCCH is configured, the number of OFDM symbols used for the legacy control region may be reduced as some of the DCIs may be transmitted in EPDCCH and less PDCCH resources may be needed. For example, the number of control OFDM symbols may be reduced by 1 in the hypothesis tables as shown in table 3. Such reduction may be applied to parameter tables of both $Q_{in}$ and $Q_{out}$.

TABLE 3

| | |
|---|---|
| Number of control OFDM symbols | 1; Bandwidth ≥ 10 MHz |
| | 2; 3 MHz ≤ Bandwidth ≤ 5 MHz |
| | 3; Bandwidth = 1.4 MHz |

For NCT, PCFICH may be defined with a fixed value, so that there may be no need to account for any PCFICH errors (i.e., PCFICH error probability=0). For this case, the RLM measurement may assume such a fixed control region. When PCFICH is fixed, there may be no need to transmit the PCFICH symbols, allowing the REs to be used to transmit PDCCH symbols. Since PCFICH is not transmitted, there may be no need to determine any PCFICH RE energy level in RLM, thus further conserving resources.

In some embodiments, RS other than CRS, such as CSI-RS, may be used for RLM. CSI-RS may be transmitted over the whole system bandwidth, thus coverage over the frequency domain may be adequate for RLM. A serving cell may also configure the measurement bandwidth for UEs. As for density, one CSI-RS port may use one RE per PRB pair along frequency in a subframe configured with CSI-RS, as compared with CRS which may use two or more REs per PRB pair along frequency in each subframe. Thus, the RE density of CSI-RS may be half of that of CRS. If the propagation channel between the eNB and the UE is flat in frequency, particularly in the case of a small cell deployment, such density of CSI-RS may be sufficient for RLM. In time domain, the minimum cycle of CSI-RS as defined in 3GPP Rel-10 is 5 ms, which may be sufficient, particularly in the case of a small cell, for RLM considering such measurement is a long term measurement and the Doppler frequency is smaller in small cell with low mobility UEs. In some embodiments, different types of RS may be combined together for RLM. For example, the UE may combine the measurements of the CRS and the CSI-RS for the RLM purpose. In one example, this may be done by an indication from an eNB via higher layer signalling such as RRC signalling or MAC control elements. In another example, this may be done by UE implementation. In yet another example, the UE may apply different combinations or different RS measurements in different scenarios.

If EPDCCH is configured on NCT and used for transmission of DCI formats that are used to derive the radio link quality measurement metrics, CSI-RS may be used for estimating propagation channel and radio link quality. The other reason may be that in some cases CRS may not be transmitted on NCT and therefore may not be used for channel estimation for RLM. As EPDCCH may use DMRS ports for demodulation, in some embodiments, the derivation of RLM may use propagation channels estimated on DMRS ports. Therefore RLM may require mapping of propagation channels from CSI-RS ports to DMRS ports.

CSI-RS may be transmitted on one, two, four or eight antenna ports using {p=15}; {p=15, 16}; {p=15, 16, 17, 18};

and {p=15, 16, 17, 18, 19, 20, 21, 22}, respectively. The CSI-RS antenna ports used in RLM may vary in accordance with the number of antenna ports used for EPDCCH common search space (CSS) transmission. For example, if antenna ports {107, 109} are used for CSS transmission on EPDCCH, two CSI-RS ports may be used for RLM.

A non-zero power (NZP) CSI-RS configuration may be dedicated to RLM. This CSI-RS configuration may be defined in addition to the current CSI-RS configurations, thus allowing each UE to have up to four (instead of three) configurations. The fourth CSI-RS configuration may be used for RLM, it may also be used for secondary purposes such as channel state information (CQI, PMI, RI) derivation.

When four CSI-RS-NZP configurations are defined, the following parameter may be used:

max$CSI$-$NZP$-$r12$ INTEGER:: = 4

-- Maximum number of $CSI$ $RS$ resource
-- configurations using non-zero $Tx$
-- power (per frequency)

The CSI-RS may be transmitted with periodicity: $T_{CSI\text{-}RS}$ of {5, 10, 20, 40, 80} subframes. Thus the radio link monitoring period may need to adjust to the CSI-RS periodicity. An example is illustrated in Table 4 below. Compared to existing CRS-based RLM where the physical layer provides indication to higher layer every radio frame (or discontinuous reception (DRX) period if DRX is configured), in the present embodiment, the physical layer may provide RLM indication to higher layer every max(10, $T_{CSI\text{-}RS}$) subframes.

TABLE 4

| CSI-RS periodicity $T_{CSI\text{-}RS}$ (subframes) | $T_{Evaluate\_Q_{out\_CSI\_Rs}}$ and $T_{Evaluate\_Q_{in\_CSI\_RS}}$ (s) (CSI-RS cycles) |
|---|---|
| 5, 10 | Same as requirements for CRS |
| 20 | 20 |
| 40 | 10 |
| 80 | 5 |

For UEs using DRX, in one example, the CSI-RS configuration (periodicity and subframe offset) may need to be defined such that CSI-RS may be transmitted during a DRX ON period. In another embodiment, the UE may simply wake up for the CSI-RS measurements even though the UE is in the DRX-off period. In this case, CSI-RS may not need to be transmitted during the DRX-ON period. The physical layer may provide RLM indication to higher layer every max(10, $T_{CSI\text{-}RS}$, DRX_cycle) subframes. Here DRX_cycle is expressed in number of subframes.

To coordinate inter-cell interference, neighbouring cells may use different PRB pairs for their EPDCCH transmission. In this case frequency domain measurement resource restriction may be applied when CSI-RS is used for radio link monitoring. Instead of using CSI-RS over the whole frequency band for radio link monitoring, the UE may use CSI-RS from those PRBs assigned for EPDCCH transmission. The UE may obtain such PRB pairs information from EPDCCH configuration transmissions.

EPDCCH may be configured for a UE to receive both UE specific and common DL control channels, i.e. both DCI 1A and DCI 1C may be monitored over EPDCCH region. In this case, a CSS (i.e. resource known to all UEs, and over which all UEs search for DL control messages) may be defined and configured for UEs served by the NCT. DMRS may always be transmitted over the CSS because the CSS may be shared by all the UEs in a cell. Therefore, such DMRS ports may be used to monitor DL radio quality by the UE. Thus, DMRS may be available in every subframe and improved link quality estimation may be achieved. CSS transmission in EPDCCH may use distributed EPDCCH transmission. In this case, DMRS ports {107, 109} may be used and random precoding may be applied to both EPDCCH and DMRS ports. As DMRS ports {107, 109} are alternatively assigned through REs for CSS, both DMRS ports may be used for RLM.

In some embodiments, even if a UE is configured to receive EPDDCH, the UE may not expect to receive EPDCCH in all subframes due to various reasons, in which case, UE still needs to monitor legacy PDCCH. As described above, CRS may be used for legacy PDCCH decoding while DMRS may be used for EPDCCH demodulation. The UE may determine between hypothetical PDCCH and hypothetical EPDDCH in several ways. In some cases, if the DCI formats (DCI format 1A and 1C) used for radio link quality measurement are transmitted in legacy PDCCH region, then CRS may be used for RLM. In some other cases, if such DCI formats are transmitted in EPDCCH, CSI-RS may be used for RLM. If EPDCCH is configured, it may not be transmitted in every subframe. In such subframes, the UE may need to monitor legacy PDCCH. In this embodiment, the UE may switch between CRS and CSI-RS for radio link quality measurement. Considering that radio link quality measurement is a long term measurement on radio link quality and if EPDCCH is transmitted, EPDCCH may be transmitted in majority of subframes, in some cases, the UE may use only CSI-RS for RLM. Alternatively, the UE may combine the CRS and the CSI-RS/DMRS for RLM. In this case, the UE may need to collect measurement samples from either CRS or CSI-RS transmissions in different subframes and average them over time. Different weights may be given to different types of measurement samples in order to achieve the aggregate measurement results. A layer 3 filtering may be applied to obtain the final measurement output.

The following rules may be used to implicitly select which RS may be used for radio link quality measurement: 1) if the UE does not support EPDCCH, CRS may be used for RLM measurement; 2) if CSS is supported in legacy PDCCH, CRS may be used for RLM, even if EPDCCH is configured; 3) if EPDCCH is configured and CSS is supported in EPDCCH, CSI-RS or DMRS may be used for RLM; and 4) CRS and CSI-RS/DMRS may be jointly used for RLM. In the case where implicit determination is not used, higher-layer signalling such as RRC may be used to explicitly inform the UE which RS to choose for this purpose.

Radio link quality may be measured based on estimated error rate for two hypothetical PDCCHs, namely DCI format 1A and 1C. Format 1A may represents a control channel with the most robust performance and Format 1C may represent a control channel that carries the scheduling for the most important control information such as system information. For radio link quality measurement on NCT, such DCI formats may still be used as hypothetical PDCCH for radio link quality measurement.

With the introduction of EPDCCH, the transmission of DCI formats 1A and 1C may differ from the situation used in legacy PDCCH. If CSS is not defined for EPDCCH, DCI format 1C may continue to be transmitted from CSS in legacy PDCCH and DCI format 1A may be transmitted from CSS in legacy PDCCH or UE-specific search space (USS) in EPDCCH. Considering that in this situation, DCI format 1C is also transmitted in CSS in legacy PDCCH region, it may be simpler to assume both DCI formats 1A and 1C are transmitted in legacy PDCCH. In this case, CRS may be used for radio link quality measurement. Alternatively, if DCI format 1A is transmitted in both legacy PDCCH and EPDCCH, two $Q_{out}$ may be calculated for RLM, one for the case that it is hypothetically transmitted on PDCCH using CRS and one for the case that it is hypothetically transmitted on EPDCCH using CSI-RS. If both $Q_{out}$ are worse than 10% BLER, then RL failure may be determined.

If CSS is defined in EPDCCH, both DCI format 1C and DCI format 1A may be transmitted in EPDCCH. In this case, CSI-RS may be used for radio link quality measurement. DCI format 1A may be transmitted in both localized EPDCCH and distributed EPDCCH. Considering that distributed transmission may provide a more robust performance, therefore distributed transmission may be used for DCI format 1A. For DCI format 1C, for consistency it may also be transmitted in CSS, and using distributed transmission. Distributed transmission of DCI formats for radio link quality measurement may also use random beamforming for the transmission (applying random precoding), which makes it easier to be assumed over CSI-RS in the estimation, as compared with localized transmission that a more specific precoding vector is used, and thus make it more difficult to estimate BF gain on CSI-RS.

In other cases, the set of DMRS ports, such as DMRS ports {107, 109}, may be used in the CSS of EPDCCH and utilized for RLM. In this case, the hypothetical EPDCCH transmission for RLM may assume distributed EPDCCH resource allocation, and random beamforming If DCI formats 1A and 1C are transmitted in legacy PDCCH, PCFICH error may also used in the error rate calculation. If DCI formats 1A and 1C are transmitted in EPDCCH, PCFICH error may not be used in the error rate calculation as EPDCCH configuration may be semi-statically configured through RRC signalling and no PCFICH may be involved.

If DCI format 1A and DCI format 1C are transmitted using PDCCH, legacy RLM procedure may be followed, but only for a single CRS port. In this case, Table 6 and Table 7 describe DCI format 1A and DCI format 1C respectively, which may be captured in the specification of 3GPP TS 36.133.

TABLE 6

| Attribute | Value |
|---|---|
| DCI format | 1A |
| Number of control OFDM symbols | 2; Bandwidth ≥ 10 MHz<br>3; 3 MHz ≤ Bandwidth ≤ 10 MHz<br>4; Bandwidth = 1.4 MHz |
| Aggregation level (CCE) | 4; Bandwidth = 1.4 MHz<br>8; Bandwidth ≥ 3 MHz |
| Ratio of PDCCH RE energy to average CRS RE energy | 4 dB; when single antenna port is used for cell-specific reference signal transmission by the PCell. |
| Ratio of PCFICH RE energy to average CRS RE energy | 4 dB; when single antenna port is used for cell-specific reference signal transmission by the PCell. |

Note 1:
DCI format 1A is defined in section 5.3.3.1.3 in 3GPP TS 36.212 [21].
Note 2:
A hypothetical PCFICH transmission corresponding to the number of control symbols shall be assumed . . . Such transmission may be ignored if PDCCH symbols are assumed fixed.

TABLE 7

| Attribute | Value |
|---|---|
| DCI format | 1C |
| Number of control OFDM symbols | 2; Bandwidth ≥ 10 MHz<br>3; 3 MHz ≤ Bandwidth ≤ 5 MHz<br>4; Bandwidth = 1.4 MHz |
| Aggregation level (CCE) | 4 |
| Ratio of PDCCH RE energy to average CRS RE energy | 0 dB; when single antenna port is used for cell-specific reference signal transmission by the PCell. |
| Ratio of PCFICH RE energy to average CRS RE energy | 4 dB; when single antenna port is used for cell-specific reference signal transmission by the PCell. |

Note 1:
DCI format 1C is defined in section 5.3.3.1.4 in 3GPP TS 36.212 [21].
Note 2:
A hypothetical PCFICH transmission corresponding to the number of control symbols shall be assumed. Such transmission may be ignored if PDCCH symbols are assumed fixed.

If DCI format 1A and DCI format 1C are transmitted using EPDCCH, antenna configuration used in the link quality estimation may be the same as configured for EPDCCH CSS of the given subframe. In this case, Table 8 and Table 9 describe DCI format 1A and DCI format 1C respectively, which may be captured in the specification of 3GPP TS 36.133.

TABLE 8

| Attribute | Value |
|---|---|
| DCI format | 1A |
| Number of PRBs carrying the EPDCCH | N, N = 4, 8 |
| Aggregation level (ECCE) | 4; Bandwidth = 1.4 MHz<br>M Bandwidth ≥ 3 MHz,<br>M = 4, 8, 16, 32 |
| Ratio of EPDCCH RE energy to average CSI-RS (or DMRS} RE energy | x dB; when single antenna port is used for cell-specific reference signal transmission by the PCell.<br>y dB: when two or four antenna ports are used for CSI reference signal transmission by the PCell.<br>Or z dB: when DMRS ports {107, 109} are used |

Note 1:
DCI format 1A is defined in section 5.3.3.1.3 in 3GPP TS 36.212 [21].

TABLE 9

| Attribute | Value |
|---|---|
| DCI format | 1C |
| Number of PRBs carrying the EPDCCH | N,, N = 4, 8 |
| Aggregation level (ECCE) | M, M = 4, 8, 16, 32 |
| Ratio of EPDCCH RE energy to average CSI-RS (or DMRS) RE energy | x dB; when single antenna port is used for cell-specific reference signal transmission by the PCell.<br>y dB: when two or four antenna ports are used for CSI reference signal transmission by the PCell.<br>Or z dB, when DMRS ports {107, 109} are used |

Note 1:
DCI format 1C is defined in section 5.3.3.1.4 in 3GPP TS 36.212 [21].

As described above, with NCT, both DCI formats 1A and 1C may still be used for radio link quality measurement. If CSS is transmitted on legacy PDCCH, hypothetical PDCCHs (DCI formats 1A and 1C) for radio link quality measurement may be transmitted from legacy PDCCH. If CSS is transmitted on EPDCCH, hypothetical PDCCHs (DCI formats 1A and 1C) for radio link quality measurement may be transmitted from EPDCCH. In this case, distributed EPDCCH transmission may be used for both DCI formats 1A and 1C for radio link measurement, and Random beam forming (RBF) may be assumed as the transmit diversity for both DCI format 1A and 1C. PCFICH error estimation may not be included in radio link quality estimation when hypothetical PDCCHs are transmitted from EPDCCH.

If carrier aggregation (CA) is configured for a UE, RLM may be accomplished assuming DCI format 1A and 1C are transmitted on a PCell. In this case, two types of NCT may be identified, one may be stand-alone NCT and the other may be non stand-alone NCT. The stand-alone NCT may be a NCT that is not associated with any legacy carrier, while non stand-alone NCT may be a NCT that is associated with a legacy carrier.

The non stand-alone NCT may be further categorized into synchronized NCT and non-synchronized NCT. Synchronized NCT may be a NCT that is fully synchronized in both time and frequency with a legacy carrier. No additional synchronization operation may be needed on such NCT. Such NCT may be assumed to be in the same band of spectrum as legacy carrier and may be co-located with legacy carrier. For synchronized NCT, as there may be no need to do synchronization operations on the NCT, the CRS may not be transmitted on NCT. If this is the case, RLM may be measured on the legacy carrier, which may also be the PCell. Alternatively, if CSI-RS is transmitted on NCT, and EPDCCH is configured on NCT, either CSI-RS based or DMRS based RLM or the combination of both may be used with the assumption that DCI formats 1A and 1C are transmitted on EPDCCH.

The non-synchronized NCT may be a NCT that is not synchronized with a legacy carrier. Non-synchronized NCT may require embedded synchronization signals. A non-synchronized carrier may be assumed to be in a different spectrum band as the legacy carrier and may not be co-located with the legacy carrier. For non-synchronized NCT, the CRS may still be transmitted on NCT with a reduced number of ports and density for synchronization tracking and RLM measurement. In this case, CRS may be used for RLM with the assumption that DCI formats 1A and 1C are transmitted on PDCCH on NCT. Alternatively, CSI-RS or DMRS may be used for this purpose with the assumption that DCI formats 1A and 1C are transmitted on EPDCCH configured on NCT. Yet in another alternative, RLM may be done on the legacy carrier when the NCT carrier is not a stand-alone carrier.

For stand-alone NCT, RLM may be done on NCT with the assumption that DCI formats 1A and 1C are transmitted on either PDCCH or EPDCCH depending on if EPDCCH is configured or not on stand-alone NCT. CRS or CSI-RS or DMRS or a combination of them may be used for RLM depending on if DCI formats 1A and 1C are transmitted on PDCCH or EPDCCH. If legacy PDCCH and CRS is not transmitted on such NCT, CSI-RS or DMRS may be used for RLM with the assumption that DCI formats 1A and 1C are transmitted on EPDCCH.

As described above, small cells may be deployed under the coverage of a macro-cell. In this case, the UE may build and maintain two or more physical or logical connections, one with the macro-cell and one or more with the small cells. The cell or cells used for RLM may be selected implicitly as described in the following scenarios.

If the macro-cell transmits all of the control channel to the UE, the UE may perform RLM on the radio link from macro-cell or, to be more specific, the PCell from macro-cell if CA is also configured in macro-cell Depending on where DCI formats 1A and 1C are transmitted by the PCell, either on PDCCH or EPDCCH, CRS (for PDCCH) or CSI-RS/DM-RS (for EPDCCH) may be assumed to derive RLM.

If the control channel is transmitted from one of the small cells, the UE may perform PCell RLM procedure on that small cell, Depending on where DCI formats 1A and 1C are transmitted, either on PDCCH or EPDCCH, CRS (for PDCCH) or CSI-RS/DM-RS (for EPDCCH) may be assumed to derive RLM.

Both macro-cell eNB and small cell eNB may transmit the control channels to the UE. Thus the UE may perform RLM on both connections. The PCell RLM procedure may be applied to each connection, even if only one cell is officially labelled PCell. The RLM configuration on each link is determined depending on if legacy PDCCH is used on that link. As an example, the macro-cell uses legacy PDCCH, while the small cell solely relies on EPDCCH. In this case, the macro-cell link RLM may utilize CRS, while the small cell link may utilize CSI-RS or DMRS with hypothetical DCI formats 1A and 1C transmitted over the CSS of EPDCCH. In another embodiment, if the control connection is only via the macro cell, the RLM may only be applied to the macro cell and not be applied to the small cell.

If a legacy carrier is deployed in a small cell, the legacy RLM procedure defined in 3GPP LTE may be used. On the other hand, if a NCT carrier is deployed in a small cell, then the procedures discussed in the previous subsections may be used for RLM monitoring of the small cell.

The cell or cells used for RLM may also be explicitly signalled to the UE using RRC or some other control signal.

CoMP transmission/reception is introduced in 3GPP Rel-11 and n may be used to improve UE throughput at a cell's edge. In downlink, CoMP transmission coordinates the transmission of a plurality of transmit points (TPs) to a UE. Such plurality of TPs form a CoMP set. For each UE, a TP in the CoMP set will act as the major TP to interact with the UE, which is called the serving cell of the UE. The UE may receive PDCCH from the serving cell and feedback CSI measurement to the serving cell. Downlink CoMP transmission may be divided into three types: joint transmission (JT), dynamic point selection (DPS), and coordinated scheduling/coordinated beamforming (CS/CB). CoMP transmission may be used for PDSCH transmission and/or EPDCCH transmission. EPDCCH transmission may use DPS, namely, the EPDCCH transmission may be from different TPs on a subframe-to-subframe basis.

If CSS is configured in the legacy PDCCH region and transmitted from the serving cell in a CoMP scenario, the RLM may be done using CRS assuming DCI formats 1A and 1C are transmitted on PDCCH from the serving cell. If CSS is transmitted from EPDCCH exclusively in a CoMP scenario, as described above, the EPDCCH transmission may be from different transmit points (TP) on a subframe-to-subframe basis.

To derive RLM, in an embodiment, DCI formats 1A and 1C may be assumed to be transmitted from EPDCCH of the serving cell only and one or more of CSI-RS/DMRS/CRS from the serving cell may be used. In another embodiment, to derive RLM, DCI formats 1A and 1C may be assumed to be transmitted on EPDCCH from different cells alternatively in the CoMP set and corresponding CSI-RSs/DMRS from the different cells are used. Measurement samples may be averaged over time to obtain the final RLM. In yet another embodiment, only one or multiple cells in the CoMP set may be chosen and used for the RLM.

In another embodiment, RLM may be calculated for different links separately assuming DCI formats 1A and 1C are transmitted on each link. The UE may then compare the links' RL quality. For example, if all $Q_{out}$ are worse than the 10% BLER of hypothetical DCI format 1A, RL failure may be determined. If one $Q_{in}$ is better than 2% BLER of hypothetical DCI format 1C, the link may be considered reliable.

Further, different configurations may be assumed for in-sync and out-of-sync testing. For out-of-sync testing, the averaged CSI-RS quality from two TPs may be used in layer 1 filtering and comparison with $Q_{out}$. For in-sync testing, the CSI-RS of the serving cell only may be used, for determining $Q_{out}$.

Figure 9:
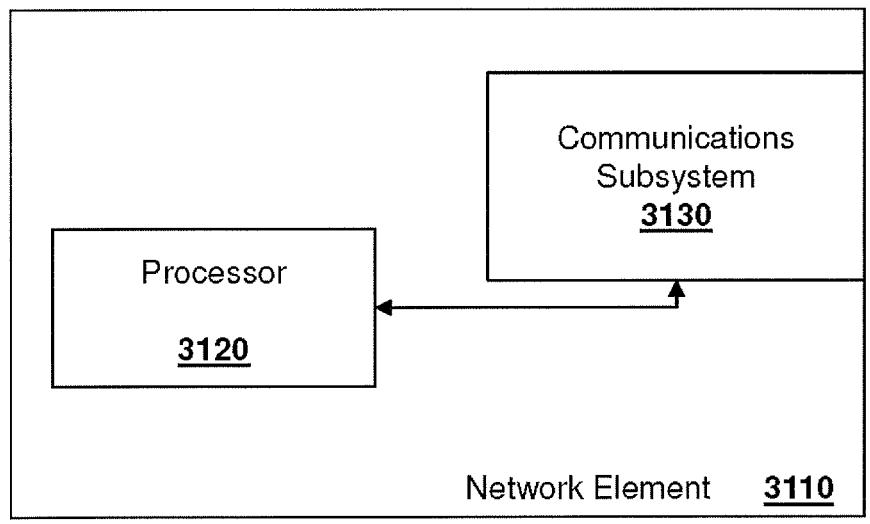
FIG. 9 is a diagram of a simplified network element.

Certain embodiments above may be implemented by a network element. A simplified network element is shown with regard to FIG. 9. In FIG. 9, network element 3110 includes a processor 3120 and a communications subsystem 3130, where the processor 3120 and communications subsystem 3130 cooperate to perform the methods described above.

Further, certain embodiments may be implemented by a UE. One exemplary device is described below with regard to FIG. 10. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Figure 10:
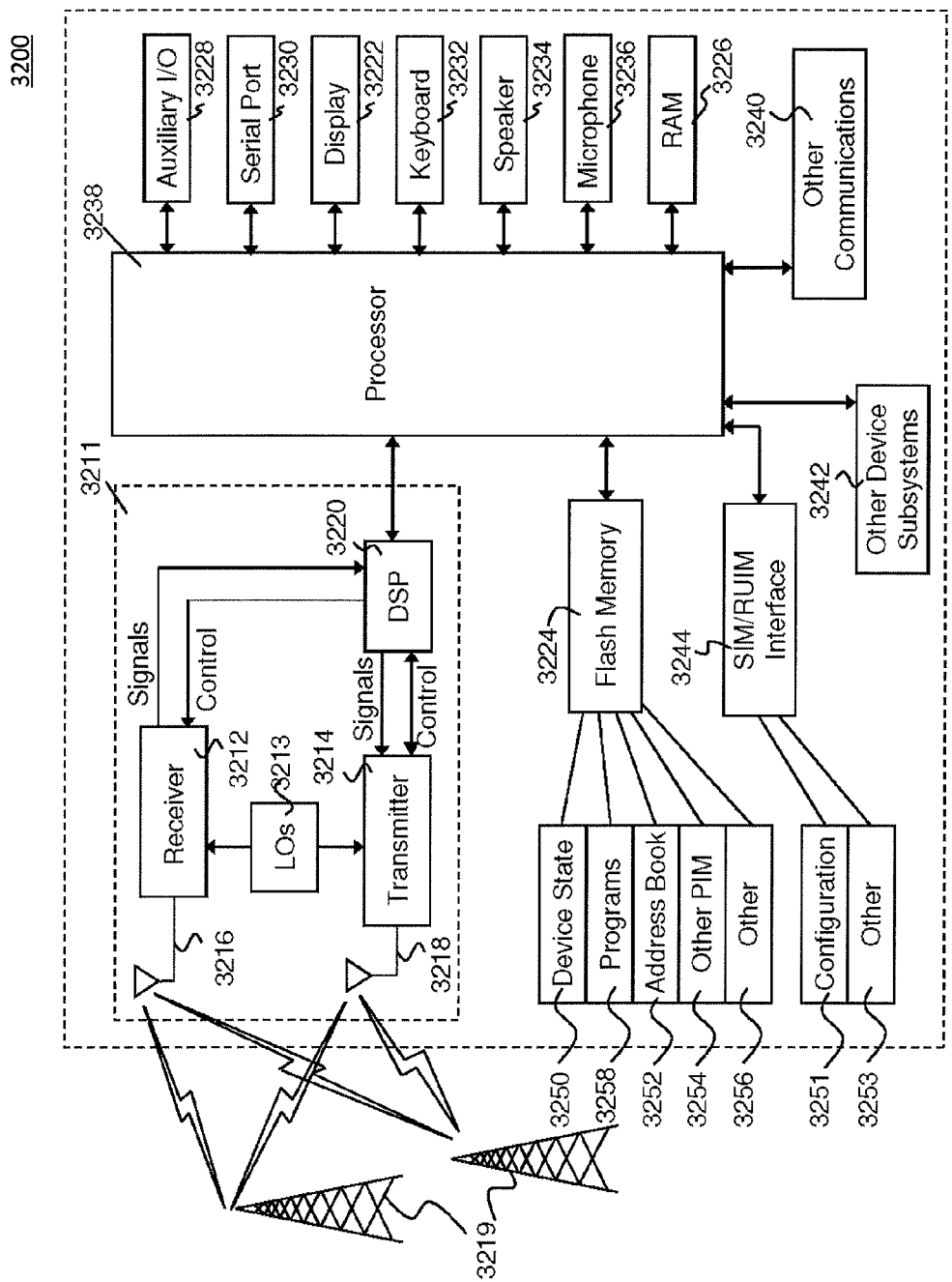
FIG. 10 is a diagram of a user equipment.

Some of the subsystems shown in FIG. 10 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications may be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or Alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 10 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The Alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

Figure 11:
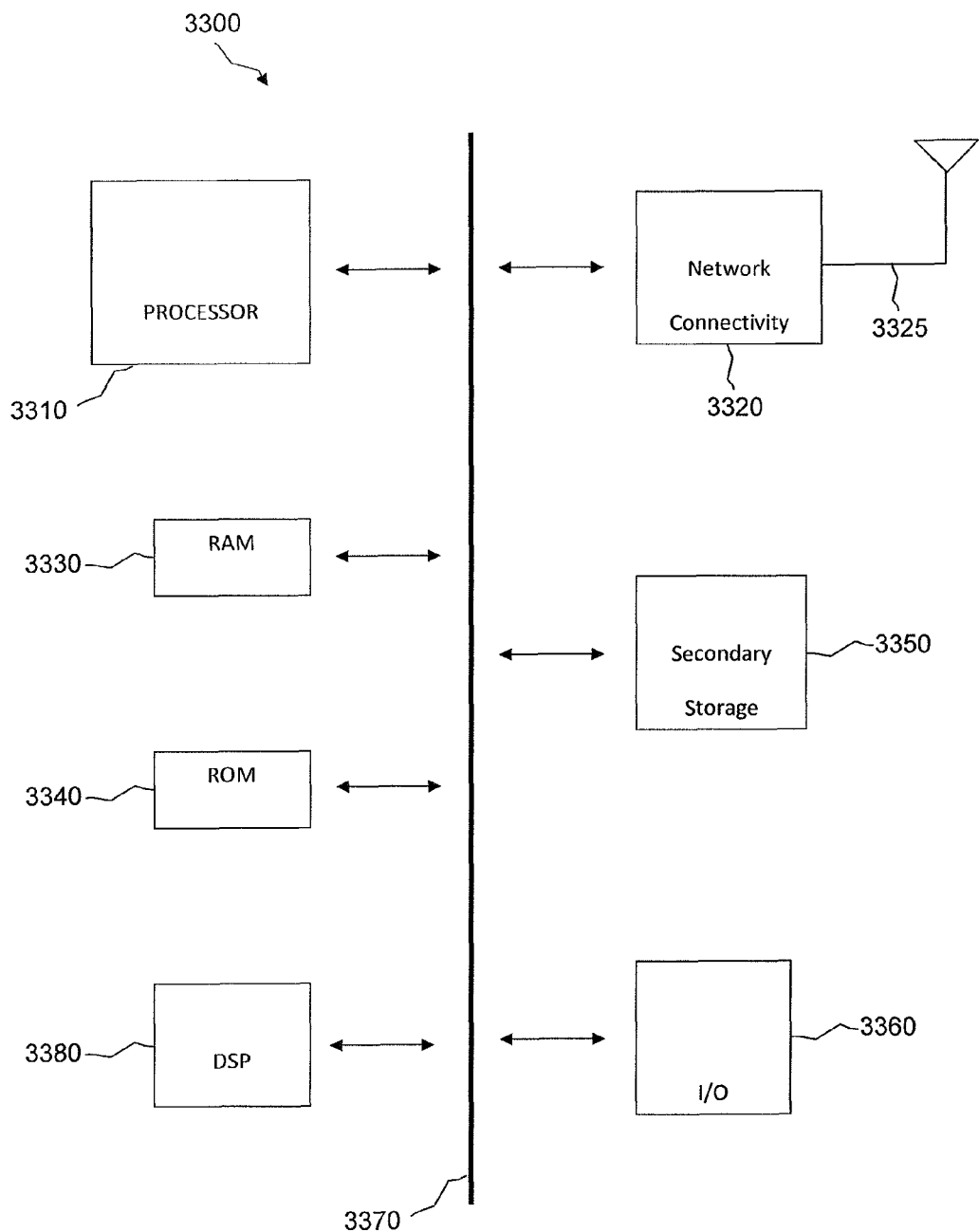
FIG. 11 is a diagram of a processing component.

The UE and other components described above might include a processing component that is capable of executing instructions related to the actions described above. As used herein, the term instructions may include reserved words which cause one or more processors to take certain computational, memory-related or control actions or to send computational, memory-related or control signals. As used herein, the term program may include a collection of computer instructions. FIG. 11 illustrates an example of a system 3300 that includes a processing component 3310 suitable for implementing one or more embodiments disclosed herein. The processing component 3310 may be substantially similar to the processor 3120 of FIG. 9 and/or the processor 3238 of FIG. 10.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips and may be a hardware device capable of executing computer instructions.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and Alterations are ascertainable by one skilled in the art and may be made without departing from the spirit and scope disclosed herein.

What is claimed is:

1. A method of radio link monitoring (RLM) in a user equipment (UE), the method comprising:
   selecting a control channel type to perform RLM on, wherein the control channel type includes one or more of:
      a physical downlink control channel (PDCCH); or
      an enhanced physical downlink control channel (EPDCCH);
   receiving a transmission on a carrier, the transmission comprising one or more reference signals;
   measuring a propagation channel condition using the one or more reference signals; and
   determining a quality of the radio link based on the selected control channel type and the measurement of the propagation channel condition,
   wherein determining the quality of the radio link further comprises: estimating a detection performance of the selected control channel for carrying a control information over the carrier.

2. The method of claim 1, further comprising sending an out-of-sync indication to a higher layer if the quality of the radio link is lower than a threshold.

3. The method of claim 1, wherein the one or more of reference signals comprise one or more of:
   a Cell-specific reference signal (CRS);
   a Channel state Information reference signal (CSI-RS); or
   a Demodulation reference signal (DMRS).

4. The method of claim 3, wherein one or more subsets of CRS, CSI-RS, or DMRS is used for radio link condition measurement.

5. The method of claim 4, wherein the one or more subsets is formed in one or more of:
   a time domain;
   a frequency domain; or
   a spatial domain.

6. The method of claim 1, wherein, if the UE is configured to monitor a common search space (CSS) on the PDCCH, PDCCH is the selected control channel type.

7. The method of claim 6, wherein CRS is used for measuring the propagation channel condition.

8. The method of claim 6, wherein the PDCCH is transmitted using a single antenna port.

9. The method of claim 1, wherein, if the UE is configured to monitor a CSS on the EPDCCH, EPDCCH is the selected control channel type.

10. The method of claim 9, wherein CSI-RS is used for measuring the propagation channel condition.

11. The method of claim 9, wherein DMRS is used for measuring the propagation channel condition.

12. The method of claim 9, wherein the EPDCCH is transmitted using distributed EPDCCH mode.

13. The method of claim 12, wherein the EPDCCH is transmitted using a transmit diversity technique.

14. The method of claim 13, wherein the transmit diversity technique is random beam forming.

15. The method of claim 1 further comprising:
   determining the quality of the radio link according to a configuration provided by a radio resource control (RRC) message.

16. The method of claim 1, wherein the control information corresponds to one or more of:
   downlink control information (DCI) format 1A; or
   DCI format 1C.

17. The method of claim 1, wherein when only EPDCCH is configured on the carrier, EPDCCH is the selected control channel type, and one or more of CSI-RS and DMRS is used for propagation channel condition measurement.

18. A User Equipment (UE) configured to perform radio link monitoring (RLM), the UE comprising a processor, configured to:
   select a control channel type to perform RLM on, wherein selecting the control channel type includes selecting one or more of:
      a physical downlink control channel (PDCCH); or
      an enhanced physical downlink control channel (EPDCCH);
   receive a transmission on a carrier, the transmission comprising one or more reference signals;
   measure a propagation channel condition using the one or more reference signals; and
   determine a quality of the radio link based on the selected control channel type and the measurement of the propagation channel condition,
   wherein the processor is further configured to determine the quality of the radio link by estimating a detection performance of the selected control channel for carrying a control information over the carrier.

19. The UE of claim 18, further configured to send an out-of-sync indication to a higher layer if the quality of the radio link is lower than a threshold.

20. The UE of claim 18, wherein the one or more of reference signals comprise one or more of:
   a Cell-specific reference signal (CRS);
   a Channel state Information reference signal (CSI-RS); or
   a Demodulation reference signal (DMRS).

21. The UE of claim 20, further configured to use one or more subsets of CRS, CSI-RS, or DMRS for radio link condition measurement.

22. The UE of claim 21, wherein the one or more subsets is formed in one or more of:
 a time domain;
 a frequency domain; or
 a spatial domain.

23. The UE of claim 18, wherein, if the UE is configured to monitor a common search space (CSS) on the PDCCH, the UE selects PDCCH as the control channel type.

24. The UE of claim 23, further configured to use CRS for measuring the propagation channel condition.

25. The UE of claim 18, wherein, if the UE is configured to monitor a CSS on the EPDCCH, the UE selects EPDCCH as the control channel type.

26. The UE of claim 25, further configured to use CSI-RS for measuring the propagation channel condition.

27. The UE of claim 25, further configured to use DMRS for measuring the propagation channel condition.

28. The UE of claim 18 further configured to:
 determine the quality of the radio link according to a configuration provided by a radio resource control (RRC) message.

29. The UE of claim 18 wherein the control information corresponds to one or more of:
 downlink control information (DCI) format 1A; or
 DCI format 1C.

30. The UE of claim 18, wherein when only EPDCCH is configured on the carrier, the UE is configured to select EPDCCH as the control channel type, and is further configured to use one or more of CSI-RS and DMRS for propagation channel condition measurement.

\* \* \* \* \*